F. M. PRESCOTT & E. P. WORDEN.
VALVE POT COVER.
APPLICATION FILED MAY 1, 1909.
1,100,095.
Patented June 16, 1914.
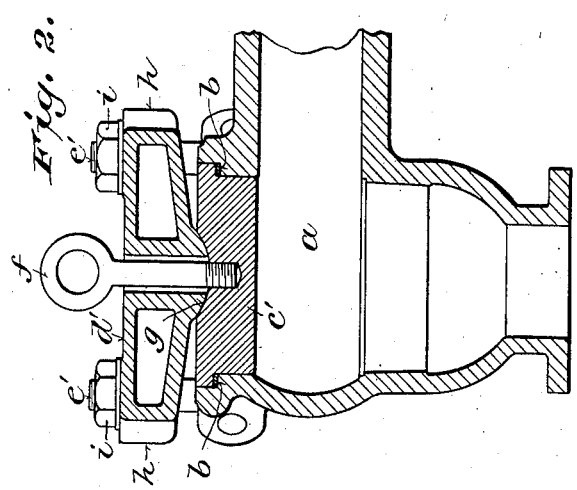
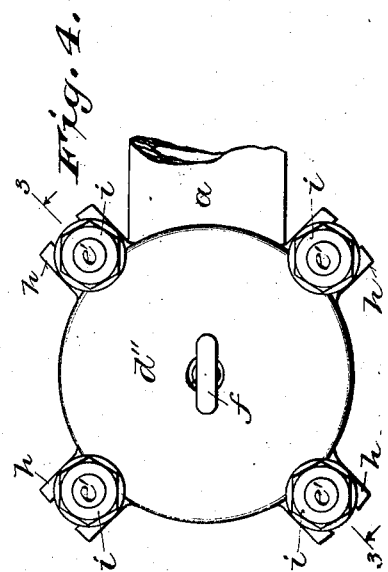
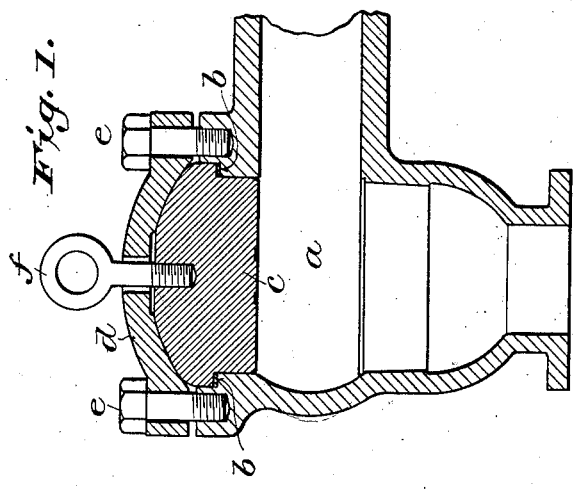
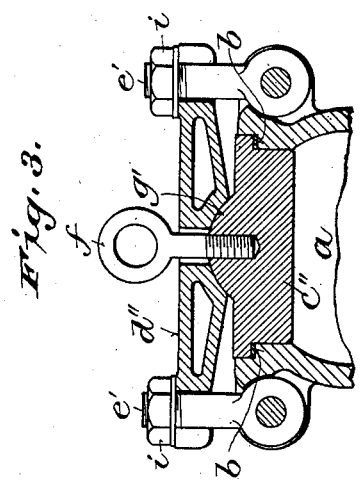
Witnesses:
Fred Palm
Chas. L. Goss
Inventors.
Frederick M. Prescott
Euclid P. Worden
By Hinkle, Hanser, Bothum & Fawsett
Attorneys.

UNITED STATES PATENT OFFICE.

FREDERICK M. PRESCOTT AND EUCLID P. WORDEN, OF MILWAUKEE, WISCONSIN, ASSIGNORS TO FRED M. PRESCOTT STEAM PUMP COMPANY, OF WEST ALLIS, WISCONSIN, A CORPORATION OF WISCONSIN.

VALVE-POT COVER.

1,100,095.   Specification of Letters Patent.   Patented June 16, 1914.

Application filed May 1, 1909. Serial No. 493,310.

*To all whom it may concern:*

Be it known that we, FREDERICK M. PRESCOTT and EUCLID P. WORDEN, citizens of the United States, residing at Milwaukee, in the county of Milwaukee and State of Wisconsin, have invented certain new and useful Improvements in Valve-Pot Covers, of which the following is a specification, reference being had to the accompanying drawing, forming a part thereof.

This invention relates to removable closures for the valve chambers of pumps.

The main objects of the invention are to evenly distribute upon the gasket or seat the pressure of the bolts or screws by which the cover is secured in place, in order to insure a tight joint and avoid the special care and attention ordinarily required to secure this result; and generally to improve the construction and operation of devices of this class.

It consists in certain novel features of construction and in the peculiar arrangement and combinations of parts as hereinafter particularly described and defined in the claims.

In the accompanying drawing like characters designate the same parts in the several figures.

Figure 1 is an axial section of one form of cover or closure embodying the invention as applied to a valve pot of the usual or common form; Fig. 2 is a like view of a modified form of the cover or closure; Fig. 3 is a similar view showing another modification; and Fig. 4 is a plan view of the form shown in Fig. 2 or Fig. 3.

Referring to Fig. 1, $a$ designates the valve pot, formed with a cover opening and a recessed seat in which a gasket $b$ of suitable packing material is inserted. $c$ is a flanged cover removably fitted in the opening and to the seat $b$ in said pot, the shoulder or face formed by the flange of the cover being adapted to rest upon the gasket $b$, interposed between it and said seat.

$d$ is a yoke adjustably secured to the pot over the cover by bolts $e$, which serve to force and hold the cover tightly against the gasket $b$ upon its seat in the pot.

In the present case the cover is formed on its upper or outer side with a convex spherical bearing face, and the yoke $d$ is formed on the under side with a corresponding concave spherical bearing face, these faces making a universal joint connection between the cover and yoke whereby the pressure exerted upon the cover when the bolts $e$ are tightly screwed into the pot is evenly distributed upon the gasket $b$, and a tight joint is insured without special care being exercised to uniformly tighten the bolts. An eye-bolt $f$ screwed or otherwise fastened in the cover $c$ and passing loosely through an enlarged hole in yoke $d$, connects the two parts and serves as means for removing them together to obtain access to the valve or interior of the valve pot.

Referring to Fig. 2, showing a modification by which the same result is obtained, the yoke $d'$ is formed on the under side with a spherical boss or bearing face $g$, which fits into a spherical seat in the upper or outer face of the cover $c'$, thereby forming a universal joint connection between the yoke and cover by which the pressure of the bolts $e'$ is evenly distributed around the cover upon the gasket $b$. In this form of closure the eye-bolts $e'$ are pivoted to the pot $a$ so as to be turned into and out of engagement with forked lugs $h$ on or notches in the yoke $d'$, and are provided with nuts $i$ for forcing and holding the cover tightly against the gasket $b$ on its seat in the pot.

Referring to Fig. 3, showing another modification by which the same result is secured, the cover $c''$ is formed on its upper or outer face with a spherical boss $g'$ which fits into a corresponding concave spherical seat on the under or inner face of the yoke $d''$. In other respects the device is substantially like that shown in Fig. 2.

In the several forms of the device herein shown and described the interfitting spherical bearings on the cover and yoke not only serve to evenly distribute the pressure exerted by the several independently adjustable fastenings by which the yoke is secured to the valve pot through the cover upon its seat, but also afford an extended support for the cover against the internal fluid pressure to which it is subjected.

Various modifications in details of construction may be made without departing from the principle and scope of the invention.

We claim:

1. The combination with a valve pot having a cover opening and seat, of a cover fitted to said seat and adapted to close said opening, a yoke adapted to span said opening, and independently adjustable fastenings distributed around and adapted to secure the yoke to the pot and to tighten the cover upon its seat, said cover and yoke having centrally disposed interfitting spherical bearings of extended area adapted to evenly distribute the pressure of the several fastenings upon the cover around its seat and forming an extended support for the cover against the internal pressure to which it is subjected.

2. The combination with a valve pot having a cover opening and seat, of a cover fitted to said seat and adapted to close said opening, a yoke adapted to span said opening and having a loose connection with the cover for removing it with the yoke from said pot, and independently adjustable fastenings distributed around and adapted to secure the yoke to the pot and to tighten the cover upon its seat, said yoke and cover having centrally disposed interfitting spherical bearings adapted to evenly distribute the pressure of the several fastenings upon the cover around its seat and forming an extended support for the cover against the internal pressure to which it is subjected.

3. The combination with a valve pot having a cover opening and seat, a cover fitted to said seat and having a spherical bearing on the outer side, a yoke having a spherical bearing thereon fitting the spherical bearing on the cover, a bolt loosely connecting the yoke and cover, and means for securing the yoke to the pot and tightening the cover on its seat at a number of points independently of one another, substantially as described.

4. The combination with a valve pot having a cover opening and seat, a cover fitted to said seat and having a spherical bearing, a yoke having a spherical bearing fitting that on the cover, an eye-bolt accessible outside the valve pot and connecting the yoke with the cover which is removable therewith, and bolts adapted to adjustably connect the yoke with the pot and to tighten the cover on its seat at a number of points independently of one another, substantially as described.

In witness whereof we hereto affix our signatures in presence of two witnesses.

FREDERICK M. PRESCOTT.
EUCLID P. WORDEN.

Witnesses:
P. M. TALLON,
R. BOWEN.